June 10, 1924.
C. R. GREUTER
LUBRICATOR
Filed May 22, 1922
1,497,503
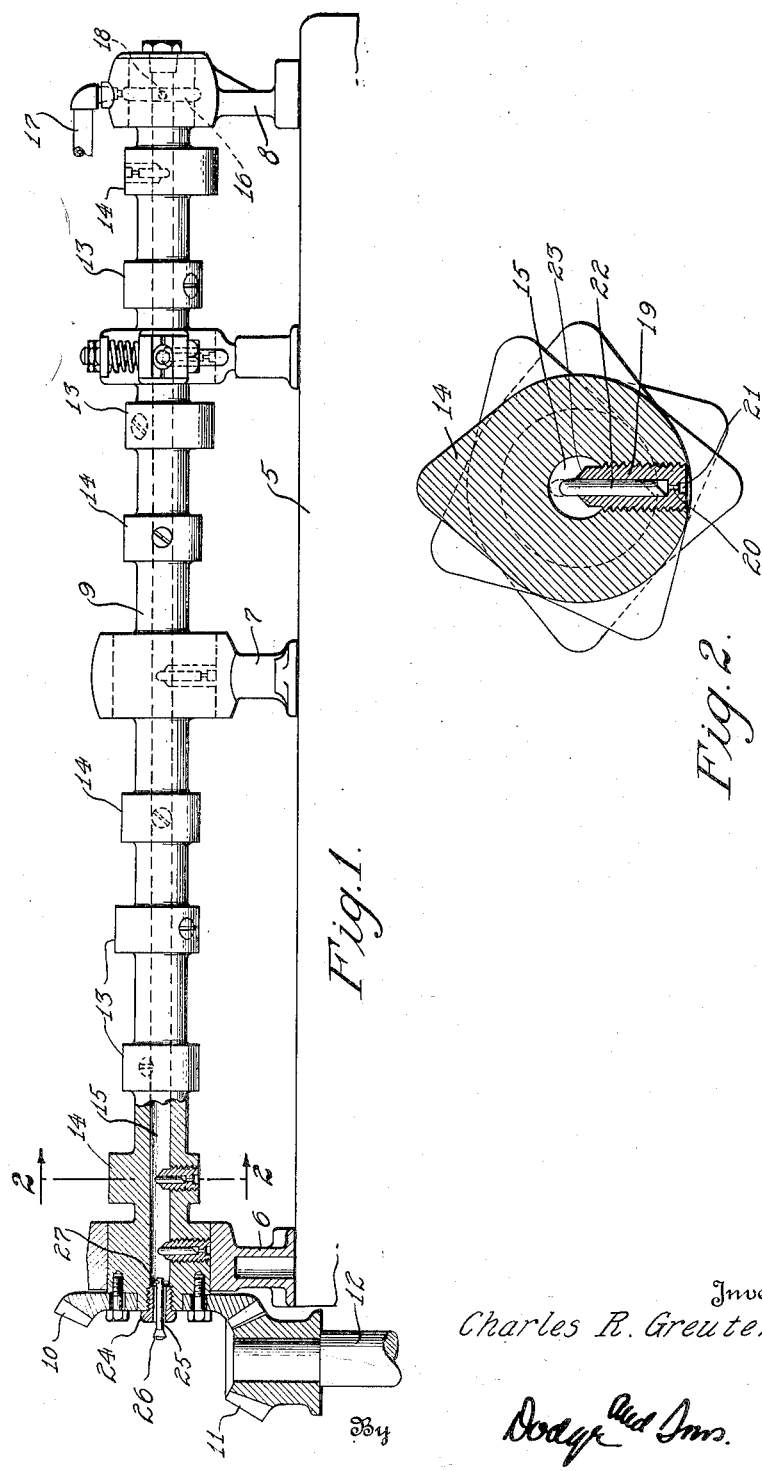
Inventor:-
Charles R. Greuter.
By Dodge and Sons.
Attorney Patented June 10, 1924.

1,497,503

UNITED STATES PATENT OFFICE.

CHARLES R. GREUTER, OF CHICAGO, ILLINOIS.

LUBRICATOR.

Application filed May 22, 1922. Serial No. 562,851.

*To all whom it may concern:*

Be it known that I, CHARLES R. GREUTER, a citizen of the United States, residing at Chicago, in the county of Cook and State of Illinois, have invented certain new and useful Improvements in Lubricators, of which the following is a specification.

This invention relates to lubrication, and particularly to the lubrication of shafts of engines by oil fed under pressure.

In high speed multi-cylinder gasoline engines, now extensively used in automobiles, it is common practice to use a system of lubrication in which oil is drawn from a reservoir in the crank case and pumped under pressure to the crank shaft bearings and to the cam shaft bearings, the oil being conducted to the bearings through ports drilled in the shafts. The pressure necessary for satisfactory lubrication of the crank shaft at high speed is commonly unduly high for the lubrication of the cams and cam shaft bearings, and results in over-feeding of oil to these parts.

In some types of engine, this over-feeding does relatively little harm, but in other types, particularly that in which the cam shaft extends over the top of the cylinders and acts directly on the stems of the inlet and exhaust valves, the excessive feed of oil is harmful, as the excess oil tends to work into the combustion space along the valve stems.

The difficulty arises from the fact that, with the pressures used, an oil port sufficiently minute to give the proper rate of oil feed is so small as to be subject to clogging. The present invention avoids this difficulty by the provision of a very narrow annular port intervening between a chamber and a suitably dimensioned filling pin. This annular port is so narrow that it resists the entrance of any clogging impurities into the annular space. To prevent the accumulation of any clogging impurities at the entrance to the restricted port, the filling pin is so mounted as to be capable of slight longitudinal movement, and is surrounded by a sharp edge defining the entrance to the oil port and coacting with the movable pin to scrape away any particles which seek entrance to the annular space.

The invention is generally useful in lubricating systems of the pressure type, but, as stated, offers its fullest utility in the case of overhead cam shaft engines.

In the drawings, I show the application of the invention to the cam shaft for a four-cylinder engine of this type.

Fig. 1 is a side elevation of the cam shaft and its bearings, the shaft being drawn in section at one end to show the internal construction.

Fig. 2 is a section on the line 2—2 of Fig. 1 looking in the direction of the arrows.

The cylinder head structure is indicated at 5, and the cam shaft bearings, which are supported thereon, are indicated generally at 6, 7 and 8. The cam shaft 9 turns in these bearings and is driven at the proper speed from the crank shaft. Part of the drive train is shown in the drawings, 10 being a bevel gear fast to the cam shaft and 11 a bevel pinion fast to the vertical shaft 12. The shaft 12 is, as is usual, driven by the engine crank shaft.

The cam shaft 9 is provided with four inlet cams 13 and four exhaust cams 14, and these cams act directly upon the valve stems of the inlet and exhaust valves (not shown) in a manner familiar to those skilled in the art. The cam shaft 9 is formed with a longitudinal oil port 15 which extends throughout its length, and which is closed at the right-hand end (with reference to Fig. 1) by a plug, or in any other suitable manner.

The bearing 8 is formed with an annular oil groove 16 to which oil is fed through the oil feed pipe 17, and the groove 16 communicates with the oil port 15 by a radial port drilled in the cam shaft and indicated at 18. This is a common construction for connecting the oil feed pipe 17 with the oil port 15, but any equivalent construction known to those skilled in the art may be substituted, as the particular arrangement adopted is not a feature of the present invention. A hole is drilled radially in each of the journals turning in the bearings 6 and 7, and also into the heel of each of the cams 13 and 14, and these holes are tapped to receive an oil discharge fitting through which the oil is discharged to the bearings 6 and 7 and to the surfaces of the various cams.

Referring now to Fig. 2, which shows on an enlarged scale the first exhaust cam in section with its lubricator fitting in place, the detailed construction of this fitting will be readily understood. A threaded body 19 is provided with a small hole or discharge port 20 in its outer end, the port 20 being larger than necessary to discharge the desired amount of oil under the pressure used in the oil feeding system. The body 19 is screwed in so that its outer end is countersunk from the face of the journal or from the heel of the cam, as the case may be, and the port 20 discharges into the transverse slot 21 which offers means for turning the body 19 with a screw driver. The body 19 is further provided with a relatively large counter bore which communicates with the discharge port 20, and in which is mounted a cylindrical filler piece 22 which nearly, but not quite, fills the counter bore.

The annular space between the filler piece 22 and the counter bore serves as a passage to control the rate of flow of oil to the discharge port 20 from the oil port 15. The inner end of the body 19 projects within the oil port 15 and is formed with a conical taper so that it terminates in a sharp edge 23 defining the entrance to the counter bore.

The filler piece 22 is beveled at its lower end to offer an oil passage to the port 20, and is of such length as to extend beyond the sharp edge 23, but not into contact with the opposite wall of the oil port 15. Under ordinary conditions, the filler piece 22 is urged radially outward by the oil pressure and reliance is had on the narrowness of the annular space to prevent the entrance of any impurities carried by the oil. The restrictive effect can be determined by choice of the diameter of the filler piece 22 or the length of the counter bore, or both. The port 20, as above suggested, is large enough to pass any oil which can reach it past the filler piece 22.

When the engine is idling, the oil pressure falls because of the low rotative speed of the force pump, or for other reasons characteristic of the system in use, and, under these conditions, the filler pieces 22 reciprocate longitudinally. At such times, the sharp edge 23 operates to shear off from the filler piece 22 any gummy or gritty deposits which might tend to accumulate at the entrance to the annular feed port. It has been found, by careful test, that it is practically impossible to produce clogging of this feed port, even with oil far more impure than is ever used in engines of this type.

The left end of the cam shaft, as viewed in Fig. 1, is provided with a modified oil feed fitting which embodies some of the features of this invention. It consists of a threaded plug 24 formed with a longitudinal port which leads to the oil port 15. This port is substantially, but not completely, filled by means of a filler piece 25 having a frusto-conical head 26. The filler piece 25 is retained against outward motion by a pin 27, and the distance between this pin and the head 26 is long enough to permit slight longitudinal motion of the filler piece.

The annular space between the filler piece and the walls of the bore in the fitting 24 serves as a restricted oil passage, and the head 26 serves as means to deflect the oil so that it strikes the teeth of the gear 10 and pinion 11. A very restricted rate of oil flow is not very important at this point, but the fitting described is less likely to clog than a simple round hole of the same effective diameter. The possibility of moving the filler piece longitudinally by hand offers a ready means for cleaning the port should it ever become even partially clogged.

The invention is generally useful wherever oil at high pressure must be fed to bearings at a relatively slow rate. The specific embodiment of the invention is subject to variation to meet particular conditions. The form shown is preferred as generally applicable to a wide range of uses.

What is claimed is:—

1. Oil discharging means for high pressure oiling systems comprising in combination a member having a discharge port larger than necessary to pass the desired amount of oil, said port communicating on its inlet side with a larger and relatively long counter bore; and a filler member of slightly less diameter than said counter bore mounted therein, the clearance between the filler member and the counter bore providing the desired area of oil passage.

2. Oil discharging means for high pressure oiling systems comprising in combination a member having a discharge port larger than necessary to pass the desired amount of oil, said port communicating on its inlet side with a larger and relatively long counter bore; and a filler member of slightly less diameter than said counter bore mounted therein, the clearance between the filler member and the counter bore providing the desired area of oil passage, said ported member having a sharp edge surrounding the entrance to said counter bore, and said filler member being capable of slight longitudinal movement in said counter bore and having a portion which projects beyond said sharp edge.

3. The combination with a shaft provided with an oil port for conducting oil under pressure; of a fitting threaded into said shaft and extending to said oil port, said fitting being provided at its outer end with a discharge port larger than necessary to pass the desired amount of oil and at its inner end with a counter bore larger than said discharge port and communicating with said discharge port and with the oil port in said shaft; and a filler member nearly but not quite filling said counter bore and extending beyond the inner end thereof, said filler member being capable of limited longitudinal movement.

4. An oil discharge fitting for use with high pressure oil systems comprising a cylindrical threaded body having an oil discharge port at one end and a counter bore communcating with said port from the other end, said member being formed with a sharp edge surrounding said counter bore; and a cylindrical filler member loosely fitted in said counter bore and having one end projecting from the same and the other end cut away to offer a free passage between said discharge port and the annular space surrounding said filler piece.

In testimony whereof I have signed my name to this specification.

CHARLES R. GREUTER.